United States Patent Office 3,015,940
Patented Jan. 9, 1962

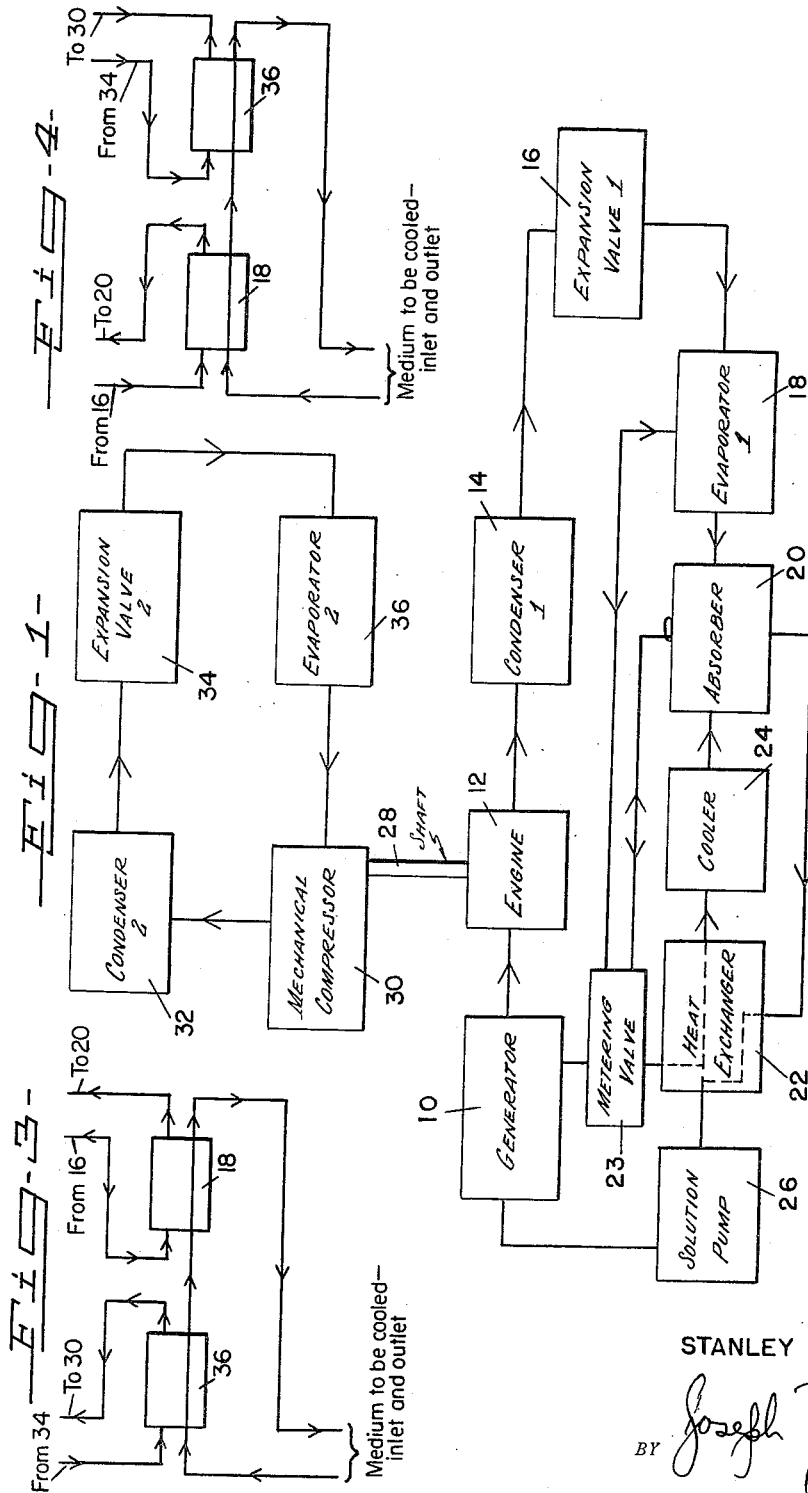

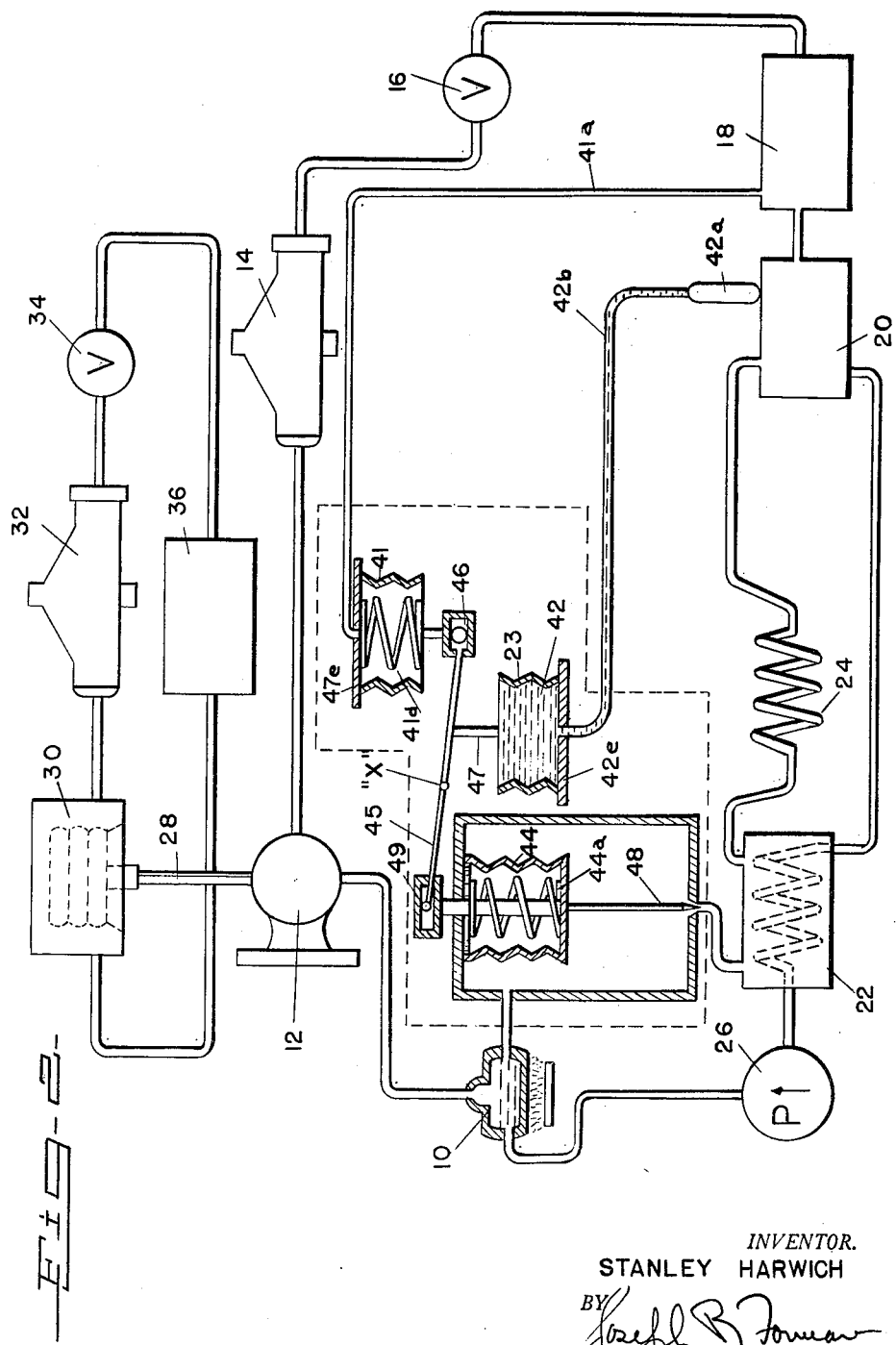

3,015,940
REFRIGERATIVE COMPRESSION SYSTEM DRIVEN BY FLUID ENERGY OF AN ABSORPTION SYSTEM
Stanley Harwich, 1471 Carroll St., Brooklyn, N.Y.
Filed July 26, 1954, Ser. No. 445,603
3 Claims. (Cl. 62—332)

This invention relates to a new and improved refrigerating process and apparatus for the same, and more particularly as the same applies to high efficiency thermally operated refrigeration systems.

In general, the thermally operated refrigeration systems have been of the absorption type, and have been less than moderately successful because of a relatively low coefficient of performance. A major obstacle, among others, to the widespread use of the absorption type refrigeration system resides in the large quantities of rejected heat, and the requirements for bulky accessory equipment such as condensers, cooling towers and the like. The relatively high cost of installation of cooling water recirculation equipment, and inefficient operation of the entire system is a further deterring factor in the acceptance of such systems.

Refrigeration in the field of transportation is relatively important in our daily lives, and much progress has been made toward obtaining satisfactory results. However the absorption type of refrigeration system has failed to gain acceptance in this field because of the unavailability of a suitable economical heat source and a practical cooling medium.

Attempts were heretofore made to utilize compression type systems driven by reciprocating steam engines. This type of operation is now obsolete as a result of its high specific fuel consumption, and the necessity for the additional use of steam auxiliaries such as boilers, condensers, feed pumps and the like.

The use of a compression refrigeration system driven by a steam turbine has been found to be economical only in the very large size installations. However here again it is necessary to complement the turbine with a complete set of auxiliaries.

The compression system of refrigeration has also been driven by the internal combustion engine. The varied shortcomings of such a system are well known. Extensive vibration, noise, noxious fumes, poor fuel economy, frequent and costly maintenance, and lack of reliability are the predominant nuisances of the aforesaid combination where small motors are utilized. The use of higher horsepower engines of multi-cylinder construction somewhat ameliorates the vibration, reliability, and fuel economy problem, depending on design, but then the initial cost of the equipment becomes excessively high.

It is a prime object of the present invention to provide an improved thermally operated refrigeration system having a comparatively high overall coefficient of performance.

It is a further object of the invention to provide a thermally operated refrigeration system of improved design and low fuel consumption requirements for given refrigeration conditions.

It is another object of the invention to provide an improved thermally operated refrigeration system, which in operation, has a resultant smaller quantity of rejected heat than comparable systems.

It is a further object of the invention to provide an improved refrigeration system wherein a plurality of refrigeration circuits have inter combination of elements to improve efficiency of operation.

It is another object of the invention to provide improved control means within a plurality of refrigeration circuits for increasing the efficiency of a refrigeration system.

It is a further object of the invention to prevent excessive generator-absorber circulation in an absorption type refrigeration system, thus increasing operational efficiency by reducing the loss of heat.

It is another object of the invention to provide an improved refrigeration system wherein a generator of an absorption circuit operates at a high temperature and produces mechanical energy for driving a second refrigeration circuit of the compression type.

It is a further object of the invention to provide an improved refrigeration system which is adaptable to being powered by solar radiation.

It is a further object of the invention to provide an improved thermally operated refrigeration system which is compact in use, and economical to assemble, service and maintain.

Other objects and advantages of the invention will hereinafter be further discussed and will also be apparent to those skilled in the art, and a fuller understanding of the invention will be afforded the reader of the following specification which makes reference to the drawing, wherein:

FIGURE 1 is a block diagram of an assembly including the invention.

FIGURE 2 is a diagrammatic view of a refrigeration system embodying the invention and showing an improved metering system within the dotted section.

FIGURE 3 illustrates a modification in which a medium to be cooled is heat exchanged with the evaporators of a compression and absorption system, respectively.

FIGURE 4 illustrates a further modification in which a medium to be cooled is heat exchanged with the evaporators of an absorption and compression system, respectively.

Referring to the drawing in detail, and more particularly to FIGURE 1, my invention includes an arrangement of component members including a generator 10. The high pressure output of generator 10 is suitably connected to the input of an engine 12, which may preferably be a high efficiency type, such as a unaflow engine.

The engine exhaust, at a lower pressure, is further connected to a condenser 14, and the output of said condenser 14 is connected to the input side of an expansion valve 16.

The output side of expansion valve 16 is connected to the input of an evaporator 18, and the output of said evaporator 18 is connected to an absorber 20.

A second network of connecting links includes a connection between generator 10 and the input of a first section of a heat exchanger 22 via metering valve 23, more fully shown within the dotted box of FIGURE 2. The output of said first section of the heat exchanger 22 is connected to a solution cooler 24.

The output of solution cooler 24 is connected to the absorber 20, and the output of absorber 20 is connected to the input of a second section of heat exchanger 22, the output of said second section of heat exchanger 22 being further connected to a solution pump 26 which may be of any known suitable type including the variable or fixed displacement type and which feeds into the generator 10. Solution pump 26 may be advantageously driven by engine 12, or may be optionally driven by an outside source of power such as an electric motor.

An illustrative embodiment of my invention includes metering valve 23 as illustrated in FIGURE 2. Metering valve 23 is designed to regulate the flow of strong generator solution from the generator to the absorber and functions in such a manner as to maintain the optimum concentration of absorber solution under a wide range of external operating conditions. This protects the generator against excessive operating pressures, and in conjunction with the variable displacement solution pump hereinafter referred to, maintains optimum circulation of solution between the generator and the absorber.

In operation, the flow of solution from the generator to the absorber is regulated by the metering rod 48 fitted within a seat as illustrated. The metering rod 48 is mounted in the valve body with a bellows seal 44 or other suitable seal type construction.

The bellows 44 of the metering valve assembly also provides protection against excessive generator pressures, since high generator solution pressures, acting on bellows 44, tend to open the metering valve, releasing the pressure into the absorber. In order not to interfere with this protection, bellows 23 should be of the liquid filled type, and not the vapor type.

The metering rod 48 is coupled to the actuating lever 45 by a pin and slot joint 49 as illustrated, the actuating lever 45 pivoting about fulcrum "X."

The actuating lever 45 is coupled to bellows 41 by a slot and pin joint 46, and bellows 42 is in contact with the actuating lever 45 by means of an actuating rod 47 as shown.

Bellows 41 is connected to the evaporator by tube 41a. Bellows chamber 42 of bellows 23 is connected to a fluid filled bulb 42a, clamped to absorber 20, through a tube 42b.

Bellows 41 and 44 are furnished with pressure compensating springs 41d and 44a respectively to equalize the disparate mechanical forces acting on the system, resulting from their connection to the high and low pressure sides of the system respectively.

In operation, bellows 41 maintains optimum absorber concentration by opening the metering valve further when evaporator pressure rises, increasing absorber concentration, which in turn decreases evaporator pressure. This operation maintains substantially constant evaporator pressure, and hence temperature under a wide range of heat load conditions. It also provides the optimum rate of absorber-generator circulation, and avoids the severe heat loss from the generator which would result from excessive circulation between these units.

Bellows 42 is provided to prevent improper system operation and provide more efficient operation under conditions of excessive absorber heat rejection medium temperature. Such conditions, causing high evaporator pressure, would promote excessive generator-absorber solution circulation, wasting quantities of heat. When excessive absorber heat rejection medium temperatures occur, bellows 42 expands, and antagonizes the action of bellows 41 under these conditions, actuating the metering rod in such a way as to restrict the generator-absorber circulation to a predetermined value appropriate to these conditions. In this case, the force acting on the actuating lever is the resultant of the forces exerted by bellows 41 and bellows 42.

It is obvious that the dimensional and other characteristics of the metering valve system must be designed to operate in conjunction with the specific system to which it is applied in order to provide the proper operating parameters.

As previously suggested the solution pump may be suitably powered by the engine of the refrigeration system, and should preferably be of variable displacement design under such conditions. The displacement of the pump is then regulated by the solution level in the generator, and is so regulated as to maintain a sensibly constant solution level in the generator. The design of the pump, and the mean of controlling it are well known by those versed in the art.

If it is desired that the solution pump be powered by an external source, a fixed displacement type may be employed, and its speed regulated by the level of the solution in the generator, or an on-off cycle system employed for regulation.

In particular applications, the capacity of the solution pump should be coordinated with the design of the balance of the system, and particularly the metering valve, to achieve the most efficient performance.

It is not intended to imply that the foregoing control system is the only one which may be used with this refrigeration system. Other types of pumps and metering systems are well known in the art and may be employed as dictated by any particular application. Likewise, other systems of control may be effected as by regulation of heat input, cut off control or throttle control of the engine; mechanical compressor capacity control; heat loading of evaporators; condenser generator recirculation; and/or bypassing of the engine on light loads.

Engine 12, heretofore referred to, is provided with a shaft 28, which is mechanically connected to drive a mechanical compression refrigeration system whose refrigeration circuit is independent of the one hereinbefore described, but which may be thermally integrated into the composite system, as hereinafter described. This mechanical system consists of mechanical compressor 30, condenser 32, expansion valve 34, and evaporator 36, suitably connected as illustrated.

In operation, my invention functions in the following manner. Heat from any suitable source is applied to generator 10. The generator 10 has therein a solution of a non volatile, or relatively non-volatile absorbent (such as lithium bromide), in a liquid refrigerant (such as water). When heat is applied to the generator from a suitable source, the volatile refrigerant boils and a relatively high gaseous refrigerant pressure is developed within the generator, the pressure depending upon the temperature, and the refrigerant-absorbent solution concentration. The absorbent is not present in the gaseous phase in any appreciable quantity.

The generator 10 is suitably connected to engine 12, so that the gaseous refrigerant is conducted to the engine, in which it undergoes an essentially adiabatic expansion from the generator temperature and pressure to the prevailing condenser 14 temperature and pressure.

The engine exhaust is connected to the aforesaid condenser 14, where the refrigerant exhausted by the engine is condensed from the vapor to the liquid phase, at the available heat rejection temperature, with the liberation of its latent heat of vaporization, which is conducted away by a suitable cooling medium.

The liquid refrigerant from the condenser 14 proceeds through expansion valve 16 to evaporator 18, undergoing a throttling process from the condenser pressure to the evaporator pressure, and a consequent decrease in temperature to the evaporator temperature. The liquid refrigerant in the evaporator evaporates, absorbing its latent heat of vaporization from the surrounding area to be refrigerated.

The output of said evaporator 18 is connected to absorber 20. A concentrated or strong solution of refrigerant and absorbent is maintained in the absorber 20 at the temperature of the available heat rejection medium by a connection with the generator 10. Since the vapor pressure of the solution in the absorber 20 corresponds to the saturation vapor pressure of pure refrigerant at the low evaporator temperature, any increase in evaporator temperature results in boiling of the refrigerant in the evaporator 18, and absorbtion of the evolved gaseous refrigerant by the solution in absorber 20, maintaining the low evaporator temperature and pressure, and providing means of returning the refrigerant to the generator 10, for completion of the closed cycle.

The absorber 20 is connected to the generator 10, by a solution circulation system hereinbefore described. In operation, strong solution from generator 10 flows through metering valve 23 to heat exchanger 22, where it is cooled by a stream of weak solution returning to the generator from the absorber. Thence it flows to solution cooler 24 which is in contact with the available heat rejection medium, and is cooled to the available heat rejection temperature. From solution cooler 24, the strong solution flows into absorber 20.

Weak solution from the absorber 20 is returned to the generator 10 via heat exchanger 22, where its temperature is increased as that of the counterflowing strong solution is reduced, prompting efficiency, and via solution pump 26, which pumps it from the low absorber pressure to the high generator pressure.

The shaft 28 of engine 12 is mechanically connected to drive a mechanical compression refrigeration system. In the mechanical system, compressor 30, driven by engine 12, compresses a predetermined refrigerant. The compressed refrigerant is piped from compressor 30 to a condenser 32 at which point the refrigerant is reduced to a liquid phase, at the there available heat rejection temperature. From the condenser 32, the refrigerant is passed through an expansion valve 34 into the evaporator 36. The expansion valve 34 permits the feeding of the refrigerant to the evaporator 36 under reduced pressure, and the refrigerant evaporates in the evaporator 36 and absorbs its latent heat of evaporation from the space associated therewith, and which it is desired to refrigerate.

Although, engine 12 has been shown as operating the compressor of the mechanical compression refrigeration circuit it is obvious that the same shaft may be coupled to the solution pump 26 as well, thus avoiding the necessity for additional motive means to operate the pump. It is further apparent that the shaft may, in a suitable installation, be coupled to other mechanically operated devices.

Furthermore, the engine 12 may advantageously be of any known type, including but not limited to a unaflow type, provided the same is adaptable to the system of the invention. It should however be borne in mind that the engine should have the highest overall efficiency possible in its application.

Having thus described the invention in detail, I desire to point out the following advantages of the invention in particular applications.

My invention is ideally suited to operate on heat such as is rejected from gas turbines, internal combustion machines or engines, or industrial processes, and more particularly where such sources do not supply sufficient heat for obtaining the required refrigeration when utilizing the heretofore known systems. It may likewise be operated on the ordinary fuels utilized for furnishing heat, showing great economy over previous methods and means for performing the same task. The high efficiency of my invention lends this system to application of solar heat and power for refrigeration and air conditioning. Its application as a reverse cycle heat pump also finds utility in not too severe climates where fuel is expensive, or cooling equipment is utilized and fitted with means of reversing the cycle.

The invention permits the use of power obtained from the system for operating mechanical auxiliary units.

Dual temperature refrigeration is available from a unitary system, one temperature being obtained from the mechanical system evaporator, with a second temperature being obtained from the absorption system evaporator. In some applications of this type, the efficiency of the system is raised further by assigning the mechanical system evaporator the higher temperature, a plan which increases the system coefficient of performance. Likewise, physical limitations of particular refrigerant-absorbent combinations may be avoided by assigning the appropriate evaporator the lower temperature.

The two evaporators, 18 and 36 may be operated in cascade with respect to the cooling load, as for example, the evaporator 18 pre-cools and the evaporator 36 recools the pre-cooled medium to a lower temperature. This type of operation may be used in applications involving high heat rejection temperatures which may preclude a sufficiently low absorption system evaporator temperature. The evaporators may likewise be reversed one respective to the other.

The engines utilized with the invention are not subject to severe vibration, and do not emit noxious fumes or annoying noises, and further require a minimum of service attention.

Having thus described the invention, its structure, method of operation and advantages, I desire it understood that the embodiment utilized is illustrative, and that variations will be apparent to those skilled in the art. It is therefore my intention that the claims made herein be interpreted in their broadest sense consistent with the spirit and scope of the invention.

What is claimed is:

1. A refrigeration system including in combination, an absorption refrigeration circuit and a compression refrigeration circuit, said absorption refrigeration circuit including a generator, an engine, an evaporator and an absorber therein, said generator having therein a refrigerant absorbent solution, and said compression refrigeration circuit including a compressor, means coupling said engine to said compressor, and metering means in said absorption refrigeration circuit for metering concentrated refrigerant-absorbent solution from said generator to said absorber, said metering means including an inlet port and an outlet port, a valve member within said outlet port, and means controlling said valve member in response to the temperature of said absorber and pressure in said evaporator.

2. A refrigeration system including, in combination, an absorption refrigeration circuit and a compression refrigeration circuit, said absorption refrigeration circuit including a generator, an engine, a first evaporator and an absorber therein, said generator having therein a refrigerant-absorbent solution and said compression refrigeration circuit including a compressor and a second evaporator, means coupling said engine to said compressor and means for circulating a medium to be cooled first about said first evaporator and thence about said second evaporator, and metering means in said absorption refrigeration circuit, for metering concentrated refrigerant-absorbent solution from said generator to said absorber, said metering means including an inlet port and an outlet port, a valve member within said outlet port, and means controlling said valve member in response to the temperature of said absorber and pressure in said evaporator.

3. A refrigeration system including, in combination, an absorption refrigeration circuit and a compression refrigeration circuit, said absorption refrigeration circuit including a generator, an engine, a first evaporator and an absorber, said generator having a refrigerant-absorbent solution and said compression refrigeration circuit including a compressor and a second evaporator, means coupling said engine to said compressor and means for circulating a medium to be cooled first about said second evaporator and thence about said first evaporator, and metering means in said absorption refrigeration circuit, for metering concentrated refrigerant-absorbent solution from said generator to said absorber, said metering means including an inlet port, and an outlet port, a valve member within said outlet port, and means controlling said valve member in response to the temperature of said absorber and the pressure in said first evaporator.

References Cited in the file of this patent

UNITED STATES PATENTS

| | | |
|---|---|---|
| 535,761 | Howell | Mar. 12, 1895 |
| 1,457,786 | Merriam | June 5, 1923 |

(Other references on following page)

UNITED STATES PATENTS

| | | | |
|---|---|---|---|
| 1,788,114 | Liljenroth | Jan. | 6, 1931 |
| 1,982,672 | Koenemann | Dec. | 4, 1934 |
| 2,049,664 | Rinaman | Aug. | 4, 1936 |
| 2,056,818 | Beline | Oct. | 6, 1936 |
| 2,061,606 | Zellhoefer | Nov. | 24, 1936 |
| 2,196,911 | Getaz | Apr. | 9, 1940 |
| 2,253,925 | Zimmerman | Aug. | 26, 1941 |
| 2,287,441 | McGinnis | June | 23, 1942 |
| 2,336,097 | Hutchinson | Dec. | 7, 1943 |
| 2,344,245 | Grossman | Mar. | 14, 1944 |

FOREIGN PATENTS

| | | | |
|---|---|---|---|
| 491,065 | Germany | Feb. | 5, 1930 |